United States Patent
Hamachi et al.

(10) Patent No.: US 6,626,001 B2
(45) Date of Patent: Sep. 30, 2003

(54) CONTROL APPARATUS FOR AIR-CONDITIONER FOR MOTOR VEHICLE

(75) Inventors: Masanari Hamachi, Utsunomiya (JP); Akihiko Hayashi, Tochigi-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/966,597

(22) Filed: Oct. 1, 2001

(65) Prior Publication Data

US 2002/0043072 A1 Apr. 18, 2002

(30) Foreign Application Priority Data

Oct. 12, 2000 (JP) ........................................ 2000-312615

(51) Int. Cl.[7] ................................................. F25B 1/00
(52) U.S. Cl. ........................ 62/228.1; 165/42; 165/43; 62/228.4
(58) Field of Search ................ 62/244, 323.1, 62/228.1, 228.4; 165/42, 43

(56) References Cited

U.S. PATENT DOCUMENTS

| | | | | |
|---|---|---|---|---|
| 4,416,324 A | * | 11/1983 | Sutoh et al. ................ 165/202 |
| 4,458,583 A | * | 7/1984 | Fukui et al. ................ 165/248 |
| 4,752,855 A | * | 6/1988 | Fedter et al. ............... 361/286 |
| 5,347,824 A | * | 9/1994 | Kato et al. .................... 62/133 |
| 5,546,755 A | * | 8/1996 | Krieger ........................ 62/133 |
| 5,692,991 A | * | 12/1997 | Iwata et al. .................... 477/98 |
| 5,722,236 A | * | 3/1998 | Cullen et al. ................. 60/274 |
| 5,724,941 A | * | 3/1998 | Suzuki et al. .......... 123/339.15 |
| 5,880,361 A | * | 3/1999 | Taniguchi ................ 123/41.01 |
| 6,073,456 A | * | 6/2000 | Kawai et al. .................. 62/133 |
| 6,311,505 B1 | * | 11/2001 | Takano et al. .............. 165/204 |
| 6,369,539 B1 | * | 4/2002 | Morimoto et al. .......... 318/151 |

FOREIGN PATENT DOCUMENTS

| | | |
|---|---|---|
| JP | 06-340213 A | 12/1994 |
| JP | 08-197938 A | 8/1996 |

* cited by examiner

*Primary Examiner*—William E. Tapolcai
*Assistant Examiner*—Mohammad M. Ali
(74) *Attorney, Agent, or Firm*—Arent Fox Kintner Plotkin & Kahn, PLLC

(57) ABSTRACT

A clutch of the compressor is selectively engaged and disengaged by a coaction of an engine ECU and an air-conditioning ECU. If an air-conditioning system operating switch is detected as being turned on after a startup of an engine is detected, the clutch is changed from an off-state to an on-state to actuate the compressor to discharge a liquid refrigerant therefrom on the condition that an engine coolant temperature is higher than a reference engine coolant temperature. When the engine coolant temperature is higher than the reference engine coolant temperature, e.g., 40° C., the liquid refrigerant stored in the compressor is discharged of its own accord, and hence the amount of the liquid refrigerant stored in the compressor becomes small.

9 Claims, 8 Drawing Sheets

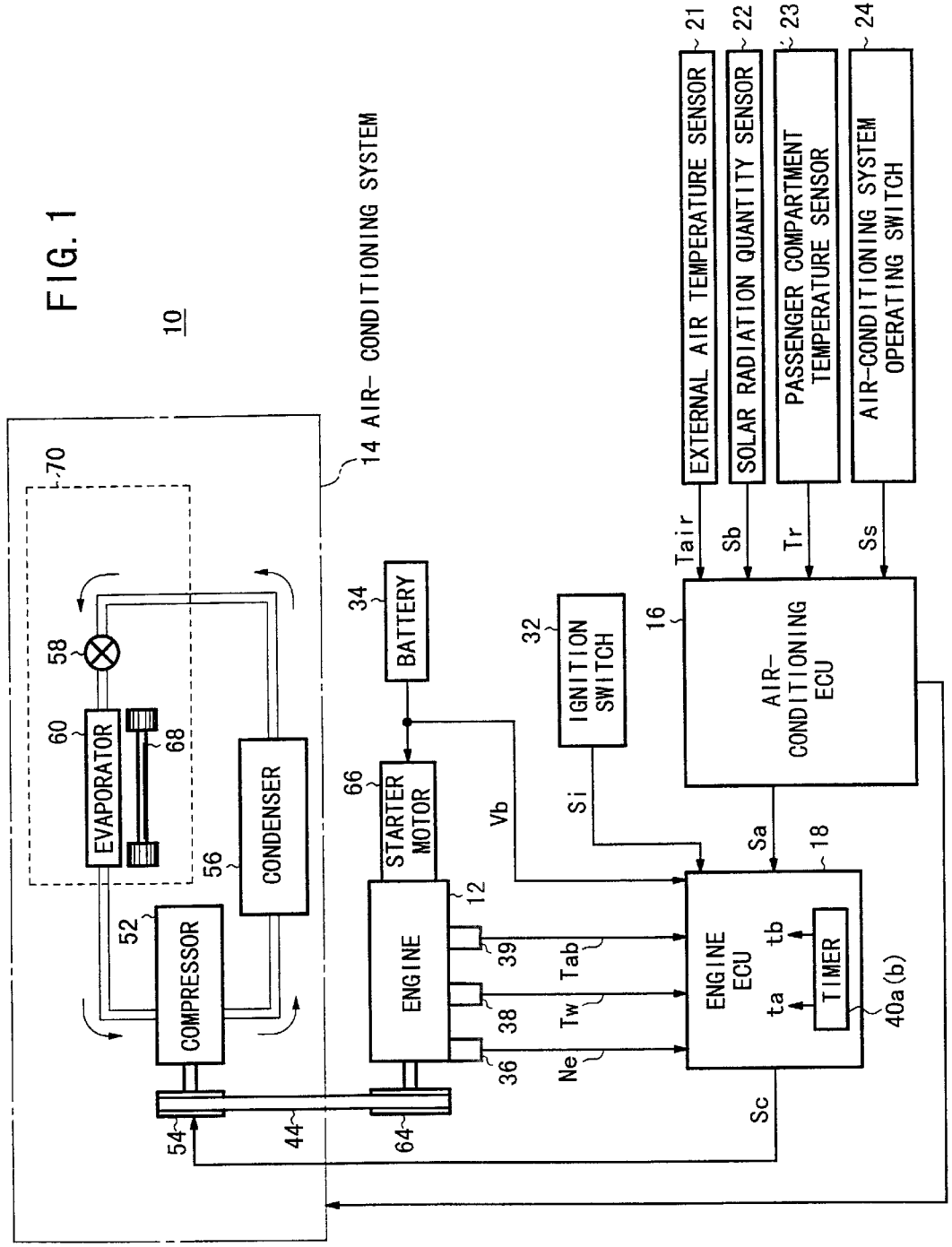

CONTROL APPARATUS FOR AIR-CONDITIONER FOR MOTOR VEHICLE

BACKGROUND OF THE INVENTION

1. Field of the Invention

The present invention relates to a motor vehicle air-conditioner control apparatus including controllers for discharging a liquid refrigerant stored in a compressor of an air-conditioner mounted on a motor vehicle.

2. Description of the Related Art

As described in Japanese laid-open patent publication No. 8-197938 (hereinafter referred to as "first technical proposal"), there has heretofore been known a phenomenon in which when a motor vehicle is left daytimes outdoors for a long period of time with its engine shut off, a liquid refrigerant is stored in the compressor of an air-conditioning system on the motor vehicle due to the difference between the temperature in the passenger compartment which rises sharply due to daylight and the temperature in the engine compartment which rises relatively gradually.

A similar phenomenon is also disclosed in Japanese laid-open patent publication No. 6-340213 (hereinafter referred to as "second technical proposal"). The second technical proposal shows that when a motor vehicle is left with its engine shut off, the compressor of an air-conditioning system on the motor vehicle becomes cooler than the condenser in a period of time from morning to evening, and during that time, the refrigerant of the air-conditioning system flows into the compressor and is stored as a liquid refrigerant therein.

Actually, as indicated by experimental results shown in FIGS. 8A and 8B of the accompanying drawings, when a motor vehicle is soaked (left) at night with its engine shut off, the refrigerant is condensed in the condenser of an air-conditioning system on the motor vehicle. Therefore, the amount Lc of a liquid refrigerant (also referred to as "liquid amount") in the compressor is small as indicated by a characteristic curve 2 in FIG. 8A when soaked at night.

From a dawn time tab on, the temperature in the passenger compartment increases due to daylight as indicated by a characteristic curve 4 in FIG. 8B. As a result, the temperature of a piping and an evaporator in a refrigerant circulation system in the air-conditioning system that is disposed in and near the passenger compartment increases gradually.

Therefore, the internal pressure of the evaporator rises, producing a force tending to push up a liquefied refrigerant into the condenser. When the refrigerant exceeds a preset height of the inlet of the condenser, the liquid refrigerant flows back into the compressor that is disposed at the lowermost end of refrigerant circulation system due to an oil return. As indicated by the characteristic curve 2 in FIG. 8A, the amount Lc of the liquid refrigerant increases owing to the daylight-induced temperature rise after the dawn time tab. The characteristic curve 4 in FIG. 8B represents data which are a linear approximation of experimental data.

The amount Lc of the liquid refrigerant sharply increases when soaked daytimes with a large amount of daylight. If the motor vehicle is left daytimes for a long period of time, then the amount Lc of the liquid refrigerant stored in the compressor whose temperature is the lowest in the air-conditioning system, i.e., the refrigerant circulation system, becomes large due to the difference between the thermal capacity of the motor vehicle and the thermal capacity of the air-conditioning system.

It is assumed that when the amount Lc of the liquid refrigerant is full or nearly full at a level "LARGE" in FIG. 8A, and also when the air-conditioning system is turned off, the engine is started and thereafter the motor vehicle is running at a high speed.

If the air-conditioning system is turned on when the motor vehicle is running at a high speed, then the clutch for transmitting the rotation of the engine to the compressor is engaged to greatly increase the internal pressure of the compressor, thus compressing the liquid refrigerant. When the compressor compresses the liquid refrigerant, it produces a large abnormal noise (liquid compressing noise).

To prevent such a liquid compressing noise from being produced, according to the first technical proposal, when the engine starts to operate at a low rotational speed, the compressor is forcibly operated by the starter motor to discharge the liquid refrigerant stored in the compressor from the compressor at a low rate.

According to the second technical proposal, if the air-conditioning system is activated during a low-refrigerant-temperature activation control waiting time, the compressor of the air-conditioning system is actuated when the rotational speed of the engine is low after the engine is able to sustain continued rotation, thereby discharging the liquid refrigerant to reduce a liquid compression noise. In an air-conditioning system where air from a blower fan is warmed by the engine coolant, the low-refrigerant-temperature activation control waiting time refers to a predetermined time for which the blower fan is turned off when the refrigerant temperature is low and the ambient temperature is low.

According to the first technical proposal, it is necessary for the starter motor to be able to produce a large output, and hence for the starter motor to suffer an increased cost, weight, and volume.

According to the second technical proposal, only when the air-conditioning system is activated during the low-refrigerant-temperature activation control waiting time, the compressor is forcibly actuated. Therefore, under other conditions, the liquid refrigerant is not discharged for reducing a liquid compression noise. The second technical proposal is also problematic in that it is not applicable to a manually operated air-conditioning mode because the second technical proposal is a control process for an automatic air-conditioning mode that is capable of controlling the blower fan.

SUMMARY OF THE INVENTION

It is therefore an object of the present invention to provide a motor vehicle air-conditioner control apparatus for discharging a liquid refrigerant stored in the compressor of an air-conditioning system mounted on a motor vehicle for thereby reducing a liquid compression noise.

According to an aspect of the present invention, a clutch is changed from a disengaged state to an engaged state to actuate an air-conditioning system compressor to discharge a liquid refrigerant therefrom when an engine coolant temperature is higher than a predetermined temperature if an air-conditioning system operating switch is detected as being turned on after a startup of an engine is detected.

When the engine coolant temperature is higher than the reference engine coolant temperature, e.g., 40° C., the liquid refrigerant stored in the compressor is discharged of its own accord, and hence the amount of the liquid refrigerant stored in the compressor becomes small. Since the compressor is actuated with the small amount of the liquid refrigerant stored therein, the liquid compression noise produced by the compressor is limited to a low level. It is not necessary to actuate the compressor with a starter motor having a large output.

According to another aspect of the present invention, an air-conditioning system compressor is actuated when an engine intake air temperature is higher than a predetermined temperature, e.g., 40° C., and lower than a multiple by 1.4, for example, of an engine coolant temperature. The air-conditioning system compressor is thus actuated when the amount of the liquid refrigerant stored therein is smaller than a predetermined amount. Therefore, the liquid compression noise produced by the compressor is limited to a low level. It is not necessary to actuate the compressor with a starter motor having a large output.

According to still another aspect of the present invention, an air-conditioning system compressor is actuated when a passenger compartment temperature is lower than a multiple by 1.2, for example, of an engine coolant temperature if an air-conditioning system operating switch is detected as being turned on after a startup of an engine is detected. The air-conditioning system compressor is thus actuated when the amount of the liquid refrigerant stored therein is smaller than a predetermined amount. Therefore, the liquid compression noise produced by the compressor is limited to a low level. It is not necessary to actuate the compressor with a starter motor having a large output.

According to yet another aspect of the present invention, the amount of a liquid refrigerant stored in an air-conditioning system compressor is judged as being small and the air-conditioning system compressor is actuated to discharge the liquid refrigerant when an engine shutoff time is shorter than a predetermined time, e.g., 4 hours, even when an engine coolant temperature is lower than a reference engine coolant temperature, e.g., 40° C., if an air-conditioning system operating switch is detected as being turned on after a startup of an engine is detected. The air-conditioning system compressor is thus actuated when the amount of the liquid refrigerant stored therein is smaller than a predetermined amount. Therefore, the liquid compression noise produced by the compressor is limited to a low level. It is not necessary to actuate the compressor with a starter motor having a large output.

According to yet still another aspect of the present invention, a clutch is changed from a disengaged state to an engaged state to actuate an air-conditioning system compressor to discharge a liquid refrigerant therefrom when an engine intake air temperature is higher than a predetermined temperature, e.g., 40° C., and lower than a multiple by 1.4, for example, of an engine coolant temperature, and an engine shutoff time is shorter than a predetermined time, e.g., 4 hours if an air-conditioning system operating switch is detected as being turned on after a startup of an engine is detected. As a result, the air-conditioning system compressor is actuated when the amount of the liquid refrigerant stored therein is smaller than a predetermined amount. Therefore, the liquid compression noise produced by the compressor is limited to a low level. It is not necessary to actuate the compressor with a starter motor having a large output.

According to a further aspect of the present invention, the amount of a liquid refrigerant is judged as being smaller than a predetermined amount and an air-conditioning system compressor can be actuated at a relatively low rotational speed when an engine coolant temperature is lower than a predetermined temperature, e.g., 35° C., and an engine rotational speed is lower than a predetermined rotational speed, e.g., 2580 rpm, if an air-conditioning system operating switch is detected as being turned on after a startup of an engine is detected. Therefore, the liquid compression noise produced by the compressor is limited to a low level. It is not necessary to actuate the compressor with a starter motor having a large output.

According to a still further aspect of the present invention, the amount of a liquid refrigerant is judged as being smaller than a predetermined amount and an air-conditioning system compressor can be actuated when an engine intake air temperature is higher than a predetermined temperature and lower than a multiple of an engine coolant temperature and an engine rotational speed is lower than a predetermined rotational speed if an air-conditioning system operating switch is detected as being turned on after a startup of an engine is detected. Therefore, the liquid compression noise produced by the compressor is limited to a low level. It is not necessary to actuate the compressor with a starter motor having a large output.

According to a yet further aspect of the present invention, the amount of a liquid refrigerant is judged as being smaller than a predetermined amount and an air-conditioning system compressor can be actuated at a relatively low rotational speed when a passenger compartment temperature is lower than a multiple of an engine coolant temperature and an engine rotational speed is lower than a predetermined rotational speed if an air-conditioning system operating switch is detected as being turned on after a startup of an engine is detected. Therefore, the liquid compression noise produced by the compressor is limited to a low level. It is not necessary to actuate the compressor with a starter motor having a large output.

According to a yet still further aspect of the present invention, the amount of a liquid refrigerant is judged as being smaller than a predetermined amount and an air-conditioning system compressor can be actuated when an engine coolant temperature is lower than a predetermined temperature and an engine rotational speed is higher than a predetermined rotational speed, on the condition that an engine operating time is longer than a predetermined time, if an air-conditioning system operating switch is detected as being turned on after a startup of an engine is detected. Therefore, the liquid compression noise produced by the compressor is limited to a low level. It is not necessary to actuate the compressor with a starter motor having a large output.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 1 is a block diagram of a motor vehicle air-conditioner control apparatus according to the present invention;

DESCRIPTION OF THE PREFERRED EMBODIMENTS

Figure 2A:
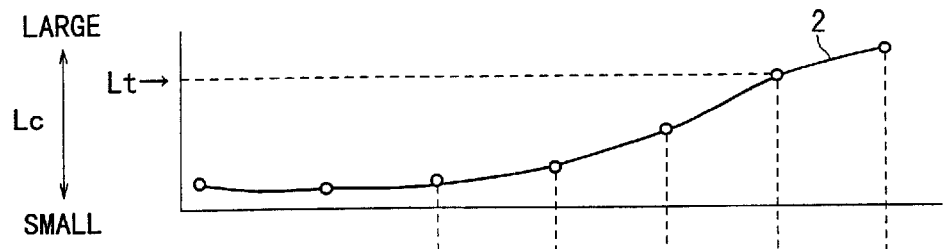
FIG. 2A is a diagram showing how the amount of a liquid refrigerant in a compressor varies from a night soaking period to a daytime soaking period while the engine on a motor vehicle which incorporates the motor vehicle air-conditioner control apparatus is being shut off.

FIG. 1 shown in block form a motor vehicle air-conditioner control apparatus 10 according to the present invention.

As shown in FIG. 1, the motor vehicle air-conditioner control apparatus 10 basically comprises an internal combustion engine 12, an air-conditioning system (also referred to as "liquid refrigerant circulation system") 14 operated by the engine 12, an engine ECU 18 as a controller (control means) for supplying a clutch signal Sc, i.e., a signal to engage or disengage a clutch, to the air-conditioning system 14, an air-conditioning ECU 16 as a controller (control means) for supplying an air-conditioning system control signal (also referred to as "air-conditioning signal") Sa to the engine ECU 18.

Each of the engine ECU 18 and the air-conditioning ECU 16 comprises a microcomputer having a CPU (Central Processing Unit), a ROM (Read-Only Memory), a RAM (Random-Access Memory), an A/D converter, an output interface, etc. The engine ECU 18 and the air-conditioning ECU 16 may be combined into a single ECU.

The air-conditioning ECU 16 is supplied with an external air temperature (also referred to as "external air temperature signal" or "external air temperature information") Tair [° C.] from an external air temperature sensor (also referred to as "external air sensor") 21 disposed near an external air inlet, a solar radiation quantity (also referred to as "solar radiation quantity signal" or "solar radiation quantity information") Sb [kcal/m²·min.] from a solar radiation quantity sensor 22, an internal air temperature (also referred to as "internal air temperature signal" or "internal air temperature information" or "passenger compartment temperature") Tr [° C.] from a passenger compartment temperature sensor (also referred to as "internal air sensor") 23, and an air-conditioning system switch signal Ss representing the information of an air-conditioning system on/off signal, a temperature setting signal, an automatic/manual air-conditioning mode switching signal, a fan on/off signal, etc. from an air-conditioning system operating switch 24.

The air-conditioning system operating switch 24 is not limited to an air-conditioning system switch for selectively turning on and off the air-conditioning system, but may be any switch for operating an air-conditioning system compressor 52 (air-conditioning system 14), such as a fan switch for operating the air-conditioning system 14 even if an air-conditioning system switch is turned off, or stated otherwise, for operating the air-conditioning system compressor 52.

The air-conditioning ECU 16 controls and actuates the air-conditioning system 14 based on the supplied information and signals.

An air-conditioning signal Sa including the air-conditioning system switch signal Ss is supplied from the air-conditioning ECU 16 to the engine ECU 18. The engine ECU 18 outputs a clutch signal Sc, which is turned on or off based on the air-conditioning signal Sa and other signals, to an electromagnetic clutch 54 of the compressor (air-conditioning system compressor) 52 of the air-conditioning system 14.

The engine ECU 18 is supplied with an ignition signal Si from an ignition switch 32, a battery voltage (also referred to as "battery voltage information" or "battery voltage signal") Vb from a battery 34, an engine rotational speed signal (also referred to as "engine rotational speed signal" or "engine rotational speed information") Ne [rpm] from an engine rotational speed sensor 36, a engine coolant temperature (also referred to as "engine coolant temperature signal" or "engine coolant temperature information") Tw [° C.] from a engine coolant temperature sensor 38, and an engine intake air temperature (also referred to as "engine intake air temperature signal" or "engine intake air information") Tab from an engine intake air temperature sensor 39.

The engine ECU 18 has a timer 40 as a time measuring means for measuring time. The timer 40 comprises a continued-rotation timer 40a and an engine-shutoff timer 40b. The continued-timer 40a starts measuring time when the engine 12 is able to sustain continued rotation, and is reset when the engine 12 is shut-off or the clutch signal Sc changes from a turned-off state to a turned-on state. The engine-shutoff timer 40b starts measuring time when the engine 12 is shut-off, and is reset when the clutch signal Sc changes from a turned-on state to a turned-off state. The continued-timer 40a functions as an engine operation time measuring means, and outputs an engine operation time ta from a startup of the engine 12. The engine-shutoff timer 40b functions as an engine shutoff time measuring means, and outputs an engine shutoff time tb.

The engine ECU 18 determines a state of the clutch signal Sc (on-state: a state for engaging the clutch 54 or off-state: a state for disengaging the clutch 54) based on signals supplied from external circuits and/or the time information from the timer 40.

The air-conditioning system 14 which is controlled by the engine ECU 18 and the air-conditioning ECU 16 is constructed as follows:

The air-conditioning system 14 comprises a compressor 52 for compressing a gas refrigerant supplied at a relatively low temperature under a relatively low pressure and outputting the gas refrigerant at a relatively high temperature of about 80° C., for example, under a relatively high pressure of 15 kgf/cm², for example, a condenser 56 for cooling the gas refrigerant from the compressor 52 with external air and discharging it as a liquid refrigerant at a temperature of about 60° C., for example, under a pressure of 15 kgf/cm², for example, an expansion valve 58 for ejecting the liquid refrigerant discharged from the condenser 56 through a constricted passage in a small hole to expand and evaporate the refrigerant and discharging it as a mist refrigerant at a low temperature of about 0° C., for example, under a low pressure of 2 kgf/cm², for example, and an evaporator 60 for evaporating and returning the refrigerant to the compressor 52 while carrying out a heat exchange to remove heat from the high-temperature air held in contact with the pipe of the evaporator 60 in the passenger compartment with the mist refrigerant passing through the evaporator 60 for thereby cooling the high-temperature air in the passenger compartment.

The air-conditioning system 14 also has a blower fan 68 disposed in facing relation to the evaporator 60. The blower fan 68 is controlled by the air-conditioning ECU 16.

Between the condenser 56 and the expansion valve 68, there is disposed a receiver tank, not shown, for temporarily storing the liquid refrigerant supplied from the condenser 56 and discharging a required amount of the stored liquid refrigerant.

The compressor 52 is actuated by the engine 12 through a crankshaft pulley 64 and a drive belt 44 when the clutch 54 is engaged by the clutch signal Sc that is turned on which is supplied from the engine ECU 18.

When the battery voltage Vb from the battery 34 is applied to the starter motor 66 (motor dynamo) at the time the ignition switch 32 is turned on, the starter motor 66 is energized and cranks the engine 12 until it sustains continued rotation, thus starting the engine 12. After the engine 12 sustains continued rotation, the starter motor 66 operates as a generator to supply a charging current to the battery 34.

As shown in FIG. 1, the evaporator 60, the blower fan 68 which applies, to the evaporator 60, internal air or external air selectively introduced by a damper (not shown), and the expansion valve 58 are disposed in the passenger compartment denoted at 70.

The motor vehicle air-conditioner control apparatus 10 according to the present invention is basically constructed as described above.

Prior to describing operation of the motor vehicle air-conditioner control apparatus 10, a decision criterion for determining whether to engage or disengage the clutch 54 of the air-conditioning system compressor 52 with the clutch signal Sc will be described below.

Figure 2B:
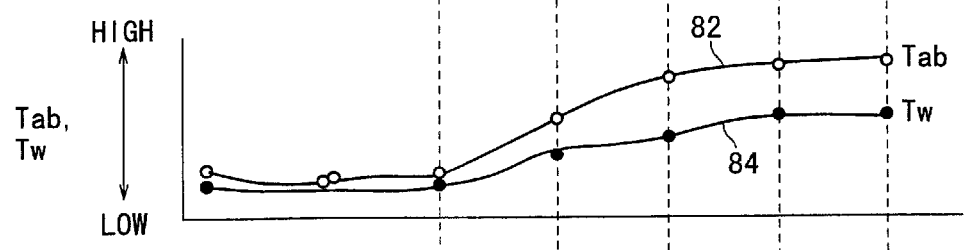
FIG. 2B is a diagram showing how an engine coolant temperature and an engine intake air temperature vary from the night soaking period to the daytime soaking period while the engine is being shut off.
Figure 2C:
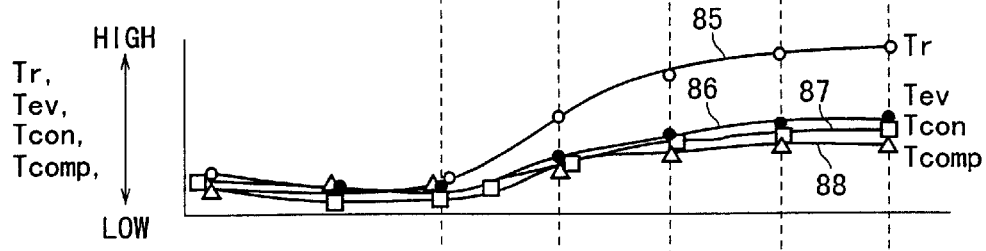
FIG. 2C is a diagram showing how a passenger compartment temperature, an evaporator temperature, a condenser temperature, and a compressor temperature vary from the night soaking period to the daytime soaking period while the engine is being shut off.
Figure 2D:
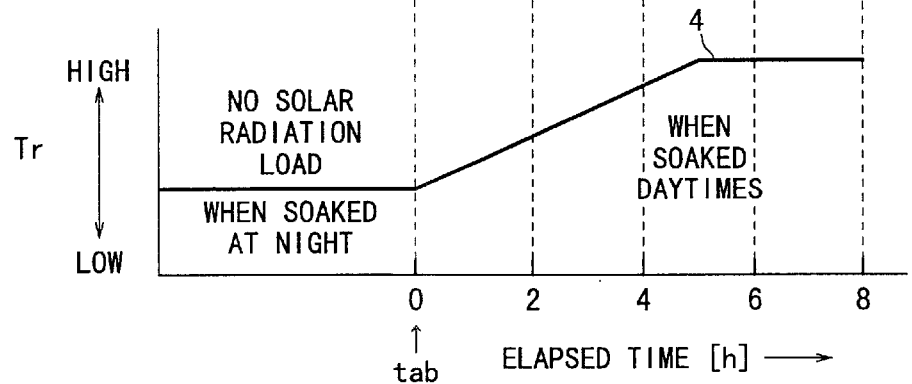
FIG. 2D is a diagram showing how the passenger compartment temperature varies from the night soaking period to the daytime soaking period while the engine is being shut off.
Figure 8A:
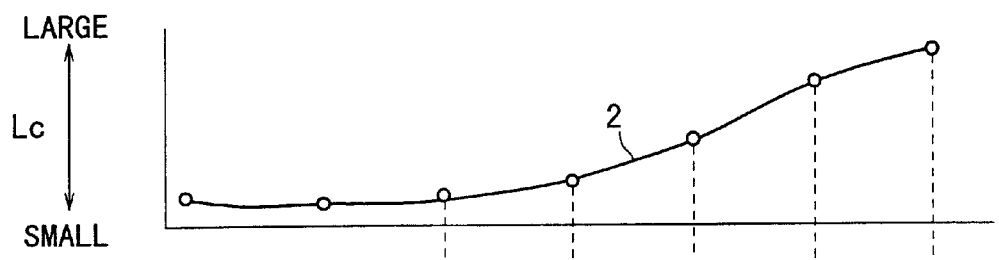
FIG. 8A is a diagram showing how the amount of a liquid refrigerant in a compressor varies from a night soaking period to a daytime soaking period while the engine on a motor vehicle which incorporates the motor vehicle air-conditioner control apparatus is being shut off.
Figure 8B:
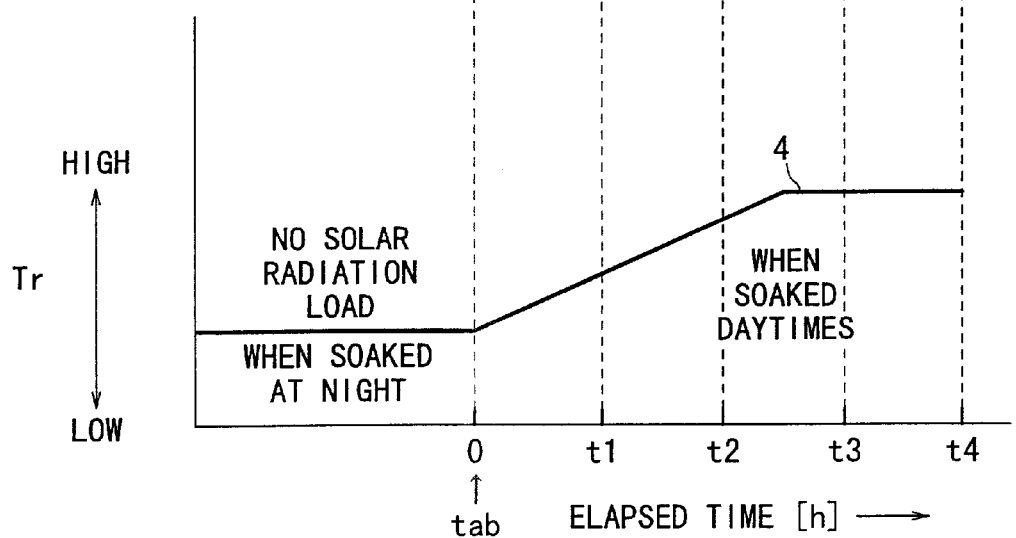
FIG. 8B is a diagram showing how the passenger compartment temperature varies from the night soaking period to the daytime soaking period while the engine is being shut off.

FIGS. 2A and 2D show the characteristic curves 2, 4, respectively, illustrated in FIGS. 8A and 8B.

For an easier understanding of the present invention, the characteristic curves 2, 4 will briefly be described again below. As shown in FIGS. 2A and 2D, when the motor vehicle is soaked (left) at night with the engine 12 shut off, the refrigerant is condensed in the condenser 56. Therefore, the amount Lc of the liquid refrigerant (also referred to as "liquid amount") in the compressor 52 is small as indicated by the characteristic curve 2.

From the dawn time tab on, the temperature in the passenger compartment 70 (passenger compartment temperature) increases due to daylight as indicated by the characteristic curve 4.

As a result, the temperature of the piping and the evaporator 60 that are disposed in and near the passenger compartment 70 increases gradually. Therefore, the internal pressure of the evaporator 60 rises, producing a force tending to push up a liquefied refrigerant into the condenser 56. When the refrigerant exceeds a preset height of the inlet of the condenser 56, the liquid refrigerant flows back into the compressor 52 that is disposed at the lowermost end of refrigerant circulation system due to an oil return. As indicated by the characteristic curve 2 in FIG. 2A, the amount Lc of the liquid refrigerant increases owing to the daylight-induced temperature rise after the dawn time tab.

The amount of the liquid refrigerant stored in the compressor 52 sharply increases when soaked daytimes with a large solar radiation quantity. If the motor vehicle is left daytimes for a long period of time, then the amount Lc of the liquid refrigerant in the compressor 52 which is of the lowest temperature in the refrigerant circulation system becomes large due to the difference between the thermal capacity of the motor vehicle and the thermal capacity of the refrigerant circulation system. Levels "LARGE", "SMALL" on the vertical axis shown in FIG. 2A which represents the amount of the liquid refrigerant indicate that the compressor 52 is substantially full of the liquid refrigerant and free of the liquid refrigerant, respectively.

If the amount Lc of the liquid refrigerant in the compressor 52 is large, i.e., if the compressor 52 is full or nearly full of the liquid refrigerant, then when the clutch 54 of the compressor 52 is engaged and the engine rotational speed is 3000 [rpm] or higher, the compressor 52 produces an abnormally large liquid compression noise. In order to reduce the liquid compression noise below a predetermined value, the clutch 54 of the compressor 52 may be engaged only when the amount Lc of the liquid refrigerant in the compressor 52 is a reference amount Lt of the liquid refrigerant (about ¾ of the full amount) as shown in FIG. 2A.

The reference amount Lt of the liquid refrigerant may be set to a desired value equal to or less than 75%, for example, of the full amount depending on the allowable level of the liquid compression noise.

Therefore, it can be seen that the liquid compression noise can be reduced to the allowable level or threrebelow by engaging the clutch 54 when the amount Lc of the liquid refrigerant in the compressor 52 is smaller than the reference amount Lt of the liquid refrigerant, i.e., Lc<Lt.

Since it is difficult to measure the amount Lc of the liquid refrigerant in the compressor 52 on the actual motor vehicle, a substitution judgment process is carried out as follows:

FIG. 2B shows characteristic curves 82 (blank dots), 84 (solid dots) indicating how the engine intake air temperature Tab and the engine coolant temperature Tw vary from the night soaking period to the daytime soaking period while the engine 12 is being shut off.

FIG. 2C shows characteristic curves 85 (blank dots), 86 (solid dots), 87 (blank squares), and 88 (blank triangles) indicating how the passenger compartment temperature Tr from the passenger compartment temperature sensor 23, an evaporator temperature Tev, a condenser temperature Tcon, and a compressor temperature Tcomp which represent the respective temperatures of the casings of the evaporator 60, the condenser 56, and the compressor 52 vary from the night soaking period to the daytime soaking period while the engine 12 is being shut off. FIG. 2D shows a characteristic curve 4 which is a linear approximation of the characteristic curve 85 shown in FIG. 2C.

Basic substitution judgment conditions for judging the amount Lc of the liquid refrigerant in the compressor 52 based on the characteristic curves shown in FIGS. 2A through 2D will be described below. In FIGS. 2A through 2D, the horizontal axis represents elapsed time (h) at intervals of 2 hours. The elapsed time varies depending on the solar radiation time, season, etc. The substitution judgment conditions, including those for varying the elapsed time, can be stored in a ROM of the air-conditioning ECU 16 or the engine ECU 18. The ROM may comprise a programmable flash ROM or the like.

The basic substitution judgment conditions comprise first through fourth basic substitution judgment conditions.

According to the first basic substitution judgment condition, after the engine 1 sustains continued rotation, if a switching from an off-state to an on-state of the air-conditioning system operating switch 24 is detected, then the clutch signal Sc is changed from an off-state to an on-state to start the air-conditioning system 14 when the measured engine coolant temperature Tw exceeds a reference coolant temperature Twt (e.g., Twt=40° C.) which is a predetermined threshold.

The reason for the above first basic substitution judgment condition is that when engine coolant temperature Tw reaches the relatively high reference coolant temperature Twt after the engine 1 sustains continued rotation, the temperature in the engine compartment is already high, and as a result the coolant temperature in the compressor 52 rises to cause the liquid refrigerant in the compressor 52 to flow to the evaporator 60 or the condenser 56. As a consequence, the amount Lc of the liquid refrigerant in the compressor 52 is equal to or smaller than the reference amount Lt of the liquid refrigerant.

According to the second basic substitution judgment condition, after the engine 1 sustains continued rotation, if a switching from an off-state to an on-state of the air-conditioning system operating switch 24 is detected, then the clutch signal Sc is changed from an off-state to an on-state to start the air-conditioning system 14 when the measured engine intake air temperature Tab is higher than a reference engine intake air temperature Tabt (e.g., Tabt=40° C.) which is a predetermined threshold, and also when the measured engine intake air temperature Tab is lower than a multiple by k1 (e.g., k=1.4) of the engine coolant temperature Tw [(Tab/Tw)<k1].

As shown in FIGS. 2A and 2B, the reason for the above second basic substitution judgment condition is that if the ratio of the engine intake air temperature Tab and the engine coolant temperature Tw is smaller than a predetermined ratio, then the amount Lc of the liquid refrigerant in the compressor 52 can be regarded as a small amount. The ratio of the engine intake air temperature Tab and the engine coolant temperature Tw may be replaced with the difference between the engine intake air temperature Tab and the engine coolant temperature Tw.

According to the third basic substitution judgment condition, after the engine 1 sustains continued rotation, if a switching from an off-state to an on-state of the air-conditioning system operating switch 24 is detected, then even when the first and second basic substitution judgment conditions are not satisfied, the clutch signal Sc is changed from an off-state to an on-state to start the air-conditioning system 14 when the measured engine rotational speed Ne is lower than a relatively low rotational speed (reference rotational speed) Net (e.g., Net=2580 rpm) which is a predetermined threshold because the liquid compression noise becomes lower than a given level.

According to the fourth basic substitution judgment condition, after the engine 1 sustains continued rotation, if a switching from an off-state to an on-state of the air-conditioning system operating switch 24 is detected, then even when the first through third basic substitution judgment conditions are not satisfied, the clutch signal Sc is changed from an off-state to an on-state to start the air-conditioning system 14 when a time (engine operating time) ta that has elapsed after the engine 1 sustains continued rotation is longer than a predetermined time (also referred to as "reference time") tat (e.g., tat=3 [min.].

Figure 3:
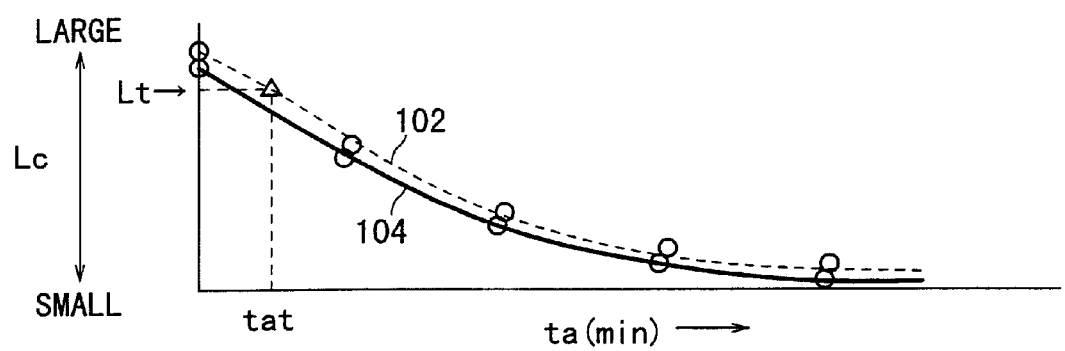
FIG. 3 is a diagram showing how the amount of the liquid refrigerant varies after the motor vehicle is soaked when the engine is operated.

As shown in FIG. 3, the reason for the fourth basic substitution judgment condition is that the amount Lc of the liquid refrigerant is smaller than the reference amount Lt of the liquid refrigerant when the reference time tat elapses after the engine 1 sustains continued rotation as can be seen from characteristic curves 102, 104 (see FIG. 3) which represent the relationship between the time ta that elapses after the engine 1 sustains continued rotation and the amount Lc of the liquid refrigerant. The characteristic curve 102 represents the manner in which the amount Lc of the liquid refrigerant is reduced when the motor vehicle runs after soaked at 0° C., and the characteristic curve 104 represents the manner in which the amount Lc of the liquid refrigerant is reduced when the motor vehicle runs after soaked at 25° C.

Figure 4:
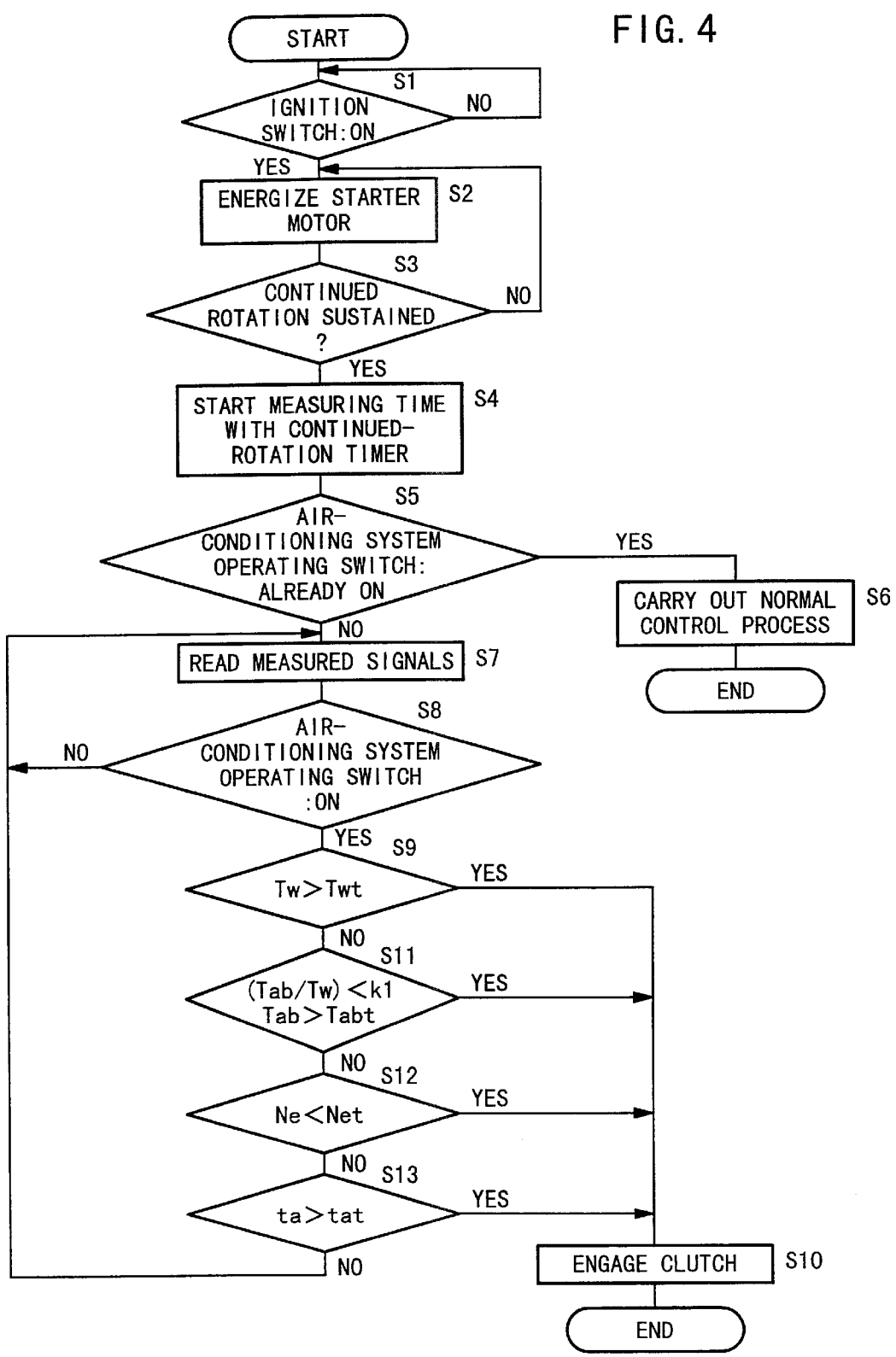
FIG. 4 is a flowchart of an operation sequence of the motor vehicle air-conditioner control apparatus shown in FIG. 1.

Operation of the motor vehicle air-conditioner control apparatus 10 shown in FIG. 1 based on the above first through fourth basic substitution judgment conditions and other judgment conditions derived therefrom will be described below with reference to FIG. 4. An operation sequence shown in FIG. 4 is implemented by a program that is stored in the ROM of the engine ECU 18 or the air-conditioning ECU 16 and read and executed by the CPU thereof.

In step S1, when the engine 12 is shut off, the CPU determines whether the ignition switch 32 is operated or not based on whether the ignition signal Si is turned on or off. When the engine 12 is shut off, the clutch signal Sc is turned off, disengaging the clutch 54 of the compressor 52.

If the ignition signal Si is turned on, then the CPU energizes the starter motor 66, cranking the engine 12 in step S2.

If the engine 12 is started, i.e., if the engine 12 sustains continued rotation as determined from the value of the engine rotational speed Ne in step S3, then the continued-timer 40a starts measuring time in step S4. Therefore, the engine rotational speed sensor Ne functions as an engine start detecting means.

In step S5, the CPU determines whether the air-conditioning system operating switch 24 is turned on or off based on the air-conditioning system switch signal Ss. If the air-conditioning system operating switch 24 comprises a mechanical switch as a discrete component, then the air-conditioning ECU 16 directly confirms an on-state or off-state of the air-conditioning system switch signal Ss. However, if the air-conditioning system operating switch 24 comprises a software-implemented switch, then the CPU reads the state of the air-conditioning system switch signal Ss that has been set in the RAM (backed up by the battery 34) or the flash ROM in the air-conditioning ECU 16 when the engine has previously been shut off, from the RAM or the ROM.

If the answer to step S5 is affirmative, i.e., if the air-conditioning system operating switch 24 is turned on after the engine 12 sustains continued rotation, then a normal control process is carried out in step S6.

In the normal control process, when the engine rotational speed is low after the engine 12 sustains continued rotation, the CPU turns on the clutch signal Sc to engage the clutch 54. Because the compressor 52 rotates at a low speed, even if the compressor 52 has stored a large amount of liquid refrigerant, the liquid refrigerant is slowly discharged from the compressor 52, and any liquid compression noise caused when the liquid refrigerant is slowly discharged is very low.

If the answer to step S5 is negative, i.e., if the air-conditioning system operating switch 24 is turned off after the engine 12 sustains continued rotation, then the CPU reads various measured signals and stores them in the RAM in the air-conditioning ECU 16 in step S7.

The read measured signals include signals representing the external air temperature Tair [° C.] from the external air temperature sensor 21, the solar radiation quantity Sb [kcal/$m^2$ min.] from the solar radiation quantity sensor 22, the internal air temperature Tr [° C.] from the passenger compartment temperature sensor 23, the air-conditioning system switch signal Ss from the air-conditioning system operating switch 24, the ignition signal Si from the ignition switch 32, the battery voltage Vb from the battery 34, the engine rotational speed Ne [rpm] from the engine rotational speed sensor 36, the engine coolant temperature Tw [° C.] from the engine coolant temperature sensor 38, the engine intake air temperature Ta from the engine intake air temperature sensor 39, and the measured times from the continued-rotation timer 40a and the engine-shutoff timer 40b.

In step S8, the CPU determines whether the air-conditioning system operating switch 24 is turned on or off from the air-conditioning system switch signal Ss. If the air-conditioning system operating switch 24 is turned off, then control returns to step S7 to read the measured signals.

If the air-conditioning system operating switch 24 is switched from the off state to the on state in step S8, then the CPU performs various decision steps to determine the time to engage the clutch 54 of the compressor 52.

Specifically, in step S9, the CPU determines whether the engine coolant temperature Tw read in step S7 exceeds the reference coolant temperature Twt or not. If the engine coolant temperature Tw exceeds the reference coolant temperature Twt (Tw>Twt), i.e., if the first basic substitution judgment condition is satisfied, then the CPU changes the clutch signal Sc from the off-state to the on-state.

When the clutch signal Sc is turned on, the electromagnetic clutch 54 is engaged to cause the compressor 52 to be actuated by the engine 12 through the crankshaft pulley 64 and the drive belt 44, thus operating the air-conditioning system 14. If the engine coolant temperature Tw has reached the reference coolant temperature Twt after the engine 12 sustains continued rotation, then the temperature in the engine compartment has been increased, and as a result, the refrigerant temperature in the compressor 52 is increased to cause the liquid refrigerant in the compressor 52 to flow to the evaporator 60 or the condenser 56. Therefore, the amount Lc of the liquid refrigerant in the compressor 52 is smaller than the reference amount Lt of the liquid refrigerant. Consequently, the liquid compression noise produced by the compressor 52 is relatively small.

If the engine coolant temperature Tw does not exceed the reference coolant temperature Twt in step S9, then control goes to step S11 to determine whether or not the engine intake air temperature Tab detected in step S7 is higher than the reference engine intake air temperature Tabt which is a predetermined threshold, and also whether or not the engine intake air temperature Tab is lower than a multiple by k1 of the engine coolant temperature Tw [(Tab/Tw)<k1], i.e., if the second basic substitution judgment condition is satisfied, then the CPU changes the clutch signal Sc from the off-state to the on-state, actuating the compressor 52 to start the air-conditioning system 14.

In this case, if the ratio of the engine intake air temperature Tab and the engine coolant temperature Tw is smaller than a predetermined ratio, then the amount Lc of the liquid refrigerant in the compressor 52 can be regarded as a small amount (see FIGS. 2B and 2C). Therefore, the liquid compression noise produced by the compressor 52 is reduced to a relatively small level.

The decision process in step S9 and the decision process in step S11 can be switched around.

If both the conditions in steps S9, S11 are not satisfied, then control goes to step S12 to determine whether or not the engine rotational speed Ne detected in step S7 is lower than the reference rotational speed Net (Ne<Net), i.e., if the third basic substitution judgment condition is satisfied, then since the liquid compression noise is lower than a given level, the CPU changes the clutch signal Sc from the off-state to the on-state, starting the air-conditioning system 14.

If all the conditions in steps S9, S11, S12 are not satisfied, then control goes to step S13 to determine whether or not the time (engine operating time) ta that has elapsed as detected by the continued-rotation timer 40a in step S7 after the engine 1 sustains continued rotation is longer than the reference time tat (ta>tat), i.e., if the fourth basic substitution judgment condition is satisfied, then the CPU changes the clutch signal Sc from the off-state to the on-state, starting the air-conditioning system 14.

If the reference time tat has elapsed after the engine 1 sustains continued rotation, then since the amount Lc of the liquid refrigerant is smaller than the reference amount Lt of the liquid refrigerant (see FIG. 3), then the liquid compression noise produced by the compressor 52 is relatively small even when the engine rotational speed Ne is higher than the reference rotational speed Net.

If neither one of the conditions in steps S9, S11, S12, S13 is satisfied after the air-conditioning system operating switch 24 is turned on as detected in step S8, then the processing in steps S7, S8, S9, S11, S12, S13 is repeated.

The processing in steps S1 through S13 is carried out in a very short time of about several hundreds [msec.].

If neither one of the conditions in steps S9, S11, S12, S13 is satisfied, then a message indicating that a very large noise may possibly be generated because of the characteristics of the air-conditioning system 14 and the air-conditioning system 14 will not be operated is given to the driver or a passenger as an audible sound that is produced from the speaker of a radio set on the motor vehicle or an image displayed on the screen of a navigation system installed on the motor vehicle.

An increasing tendency of the engine coolant temperature Tw may be predicted, and a message indicating when (how many minutes later) the air-conditioning system 14 will be turned on based on the predicted tendency may be given as a sound or an image.

In the above embodiment, as described above, the compressor 52 is started after the liquid refrigerant stored in the compressor 52 is discharged. Consequently, the liquid compression noise generated by the compressor 52 is reduced.

Figure 5:
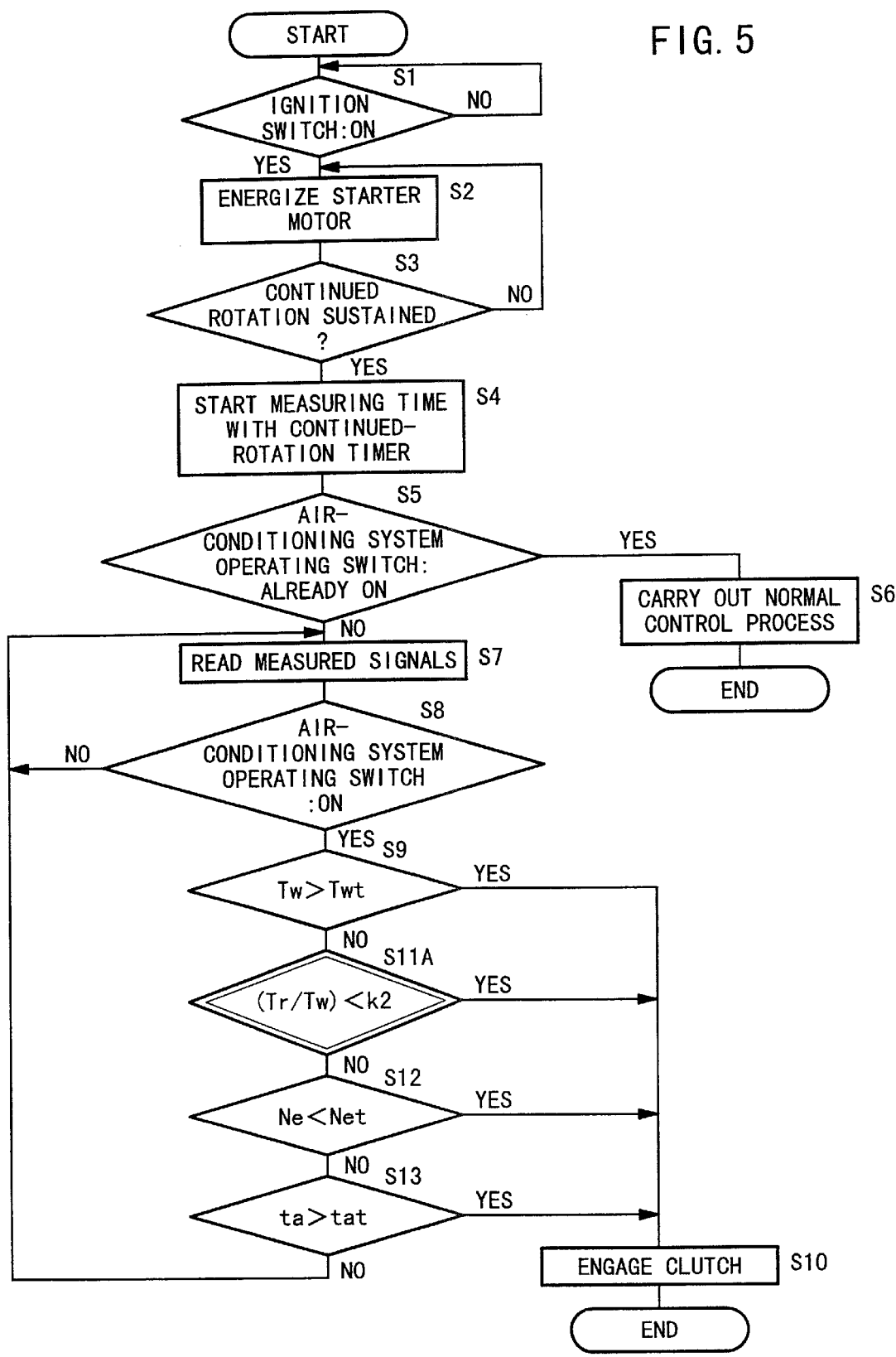
FIG. 5 is a flowchart of another operation sequence of the motor vehicle air-conditioner control apparatus shown in FIG. 1.

FIG. 5 shows another operation sequence, which employs another substitution judgment condition, of the motor vehicle air-conditioner control apparatus 10.

Those steps of the operation sequence shown in FIG. 5 which are identical to those of the operation sequence shown in FIG. 4 are denoted by identical step numbers and will not be described in detail below.

The operation sequence shown in FIG. 5 is different from the operation sequence shown in FIG. 4 in that the processing in step S11 shown in FIG. 4 is replaced with the processing in step S11A shown in FIG. 5. Step S11A is indicated by a double-line lozenge showing that it is a modified step.

In step S11A, the CPU determines whether or not the ratio of the internal air temperature Tr detected by the passenger compartment temperature sensor 23 in step S7 and the engine coolant temperature Tw detected by the engine coolant temperature sensor 38 in step S7 is smaller than k2 [(Tr/Tw)<k2]. If the ratio of the internal air temperature Tr and the engine coolant temperature Tw is smaller than k2, then the CPU operates the air-conditioning system 14. If the engine coolant temperature Tw is relatively high or the internal air temperature Tr is relatively low, then since the amount Lc of the liquid refrigerant is small, it is possible to activate the compressor 52 when the amount Lc of the liquid refrigerant is smaller than the predetermined amount, limiting the liquid compression noise to a small level.

Figure 6:
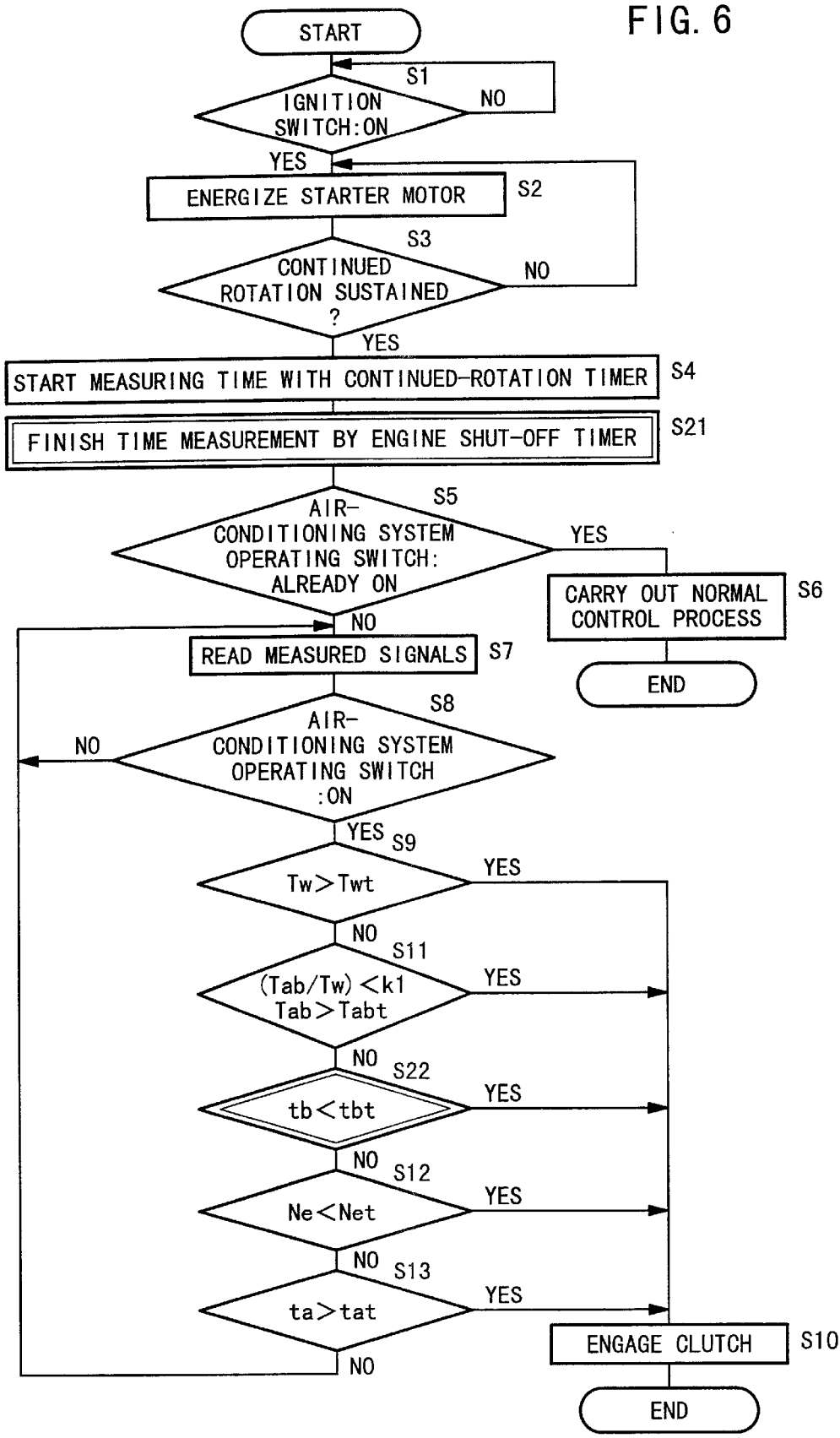
FIG. 6 is a flowchart of still another operation sequence of the motor vehicle air-conditioner control apparatus shown in FIG. 1.

FIG. 6 shows still another operation sequence, which employs another substitution judgment condition, of the motor vehicle air-conditioner control apparatus 10.

Those steps of the operation sequence shown in FIG. 6 which are identical to those of the operation sequence shown in FIG. 4 are denoted by identical step numbers and will not be described in detail below.

The operation sequence shown in FIG. 6 is different from the operation sequence shown in FIG. 4 in that the processing in step S21 (which is indicated by a double-line square showing that it is a newly added step) is inserted between steps S4, S5, and the processing in step S22 (which is indicated by a double-line lozenge showing that it is a newly added step) is inserted between steps S11, S12.

In step S21, when the engine 12 sustains continued rotation, the measurement of time by the engine-shutoff timer 40b is finished, thus determining an engine shutoff time tb which has elapsed from the preceding engine shutoff to the present engine startup.

If the air-conditioning system operating switch 24 is detected as being turned on in step S5 after the engine 12 is detected as sustaining continued rotation in step S3, and if the engine coolant temperature Tw is lower than the reference engine coolant temperature Twt in step S8 (: NO), then the CPU determines in step S22 whether or not the engine shutoff time tb is shorter than a predetermined reference time tbt of 4 hours, for example. If the engine shutoff time tb is shorter than the predetermined reference time tbt, then the CPU judges that the stored amount Lc of the liquid refrigerant is small, and changes the clutch 54 from the off-state to the on-state, operating the compressor 52. Therefore, the compressor 52 is activated when the amount Lc of the liquid refrigerant is smaller than the predetermined amount, limiting the liquid compression noise to a small level.

Figure 7:
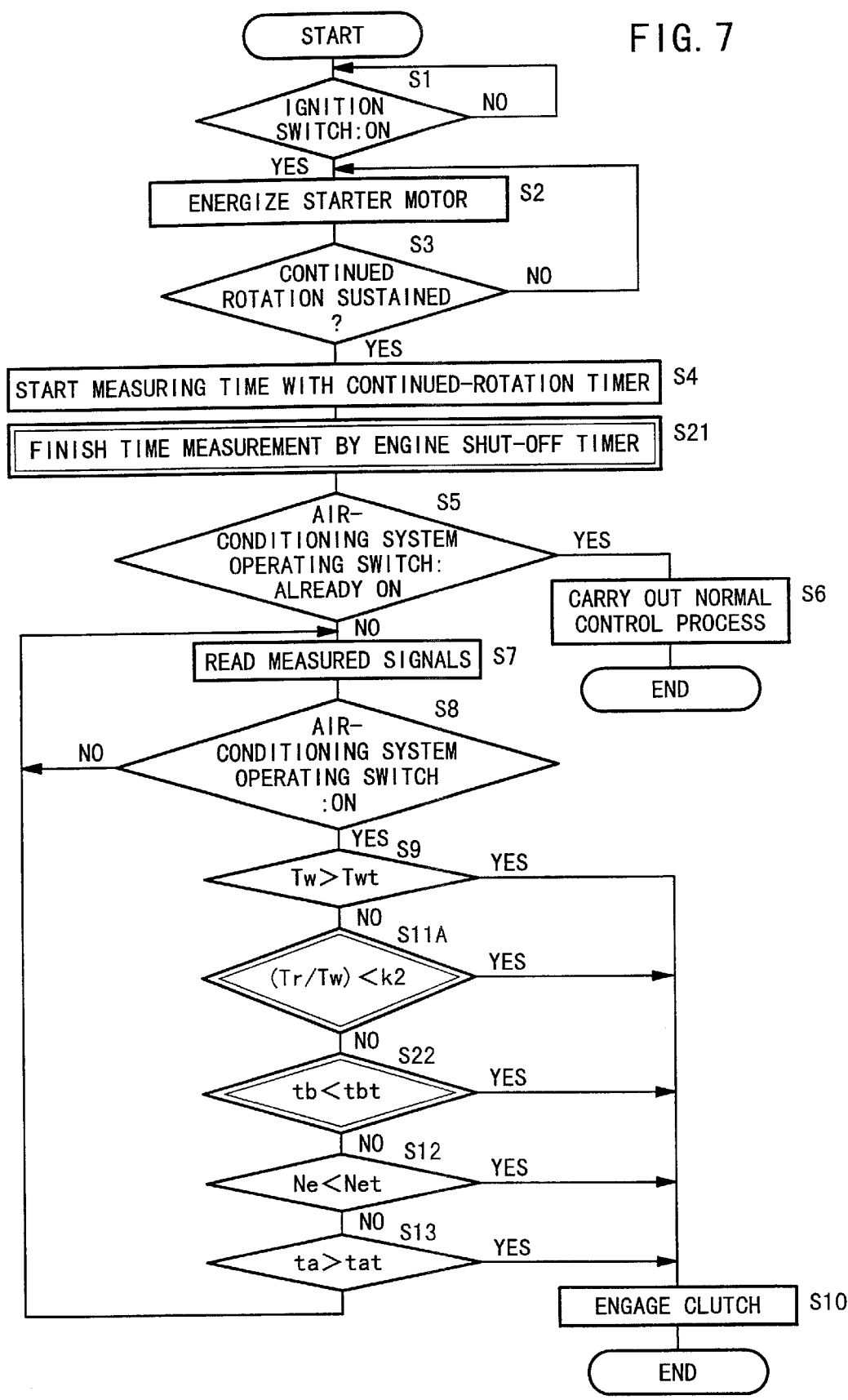
FIG. 7 is a flowchart of yet another operation sequence of the motor vehicle air-conditioner control apparatus shown in FIG. 1.

FIG. 7 shows yet another operation sequence, which employs still other substitution judgment conditions, of the motor vehicle air-conditioner control apparatus 10.

Those steps of the operation sequence shown in FIG. 7 which are identical to those of the operation sequence shown in FIG. 5 are denoted by identical step numbers and will not be described in detail below.

The operation sequence shown in FIG. 7 is different from the operation sequences shown in FIG. 5 in that the processing in step S21 is inserted between steps S4, S5, and the processing in step S22 is inserted between steps S11A, S12.

In step S21, when the engine 12 sustains continued rotation, the measurement of time by the engine-shutoff timer 40b is finished, thus determining an engine shutoff time tb which has elapsed from the preceding engine shutoff to the present engine startup.

If the air-conditioning system operating switch 24 is detected as being turned on in step S5 after the engine 12 is detected as sustaining continued rotation in step S3, and if the engine coolant temperature Tw is lower than the reference engine coolant temperature Twt in step S8 (: NO), then the CPU determines in step S22 whether or not the engine shutoff time tb is shorter than a predetermined reference time tbt. If the engine shutoff time tb is shorter than the predetermined reference time tbt even if the ratio of the passenger compartment temperature Tr and the engine coolant temperature Tw is greater than k2, then the CPU judges that the stored amount Lc of the liquid refrigerant is small, and changes the clutch 54 from the off-state to the on-state, operating the compressor 52. Therefore, the compressor 52 is activated when the amount Lc of the liquid refrigerant is smaller than the predetermined amount, limiting the liquid compression noise to a small level.

According to another embodiment, operation sequences may be employed which are similar to the operation sequences shown in FIGS. 4 and 6 except that the process of determining the engine coolant temperature in step S9 and the process of determining the engine intake air temperature and the ratio of the passenger compartment temperature and the engine coolant temperature in FIG. 11 in FIGS. 4 and 6 are dispensed with. According to still another embodiment, operation sequences may be employed which are similar to the operation sequences shown in FIGS. 5 and 7 except that the process of determining the engine coolant temperature in step S9 and the process of determining the ratio of the passenger compartment temperature and the engine coolant temperature in step 11A in FIGS. 5 and 7 are dispensed with.

According to the present invention, as described above, the liquid refrigerant stored in the compressor of the air-conditioning system mounted on the motor vehicle is discharged to reduce the liquid compression noise generated by the compressor.

Since the compressor is operated after the engine sustains continued operation, the compressor does not need to be actuated by the starter motor, and hence the starter motor may have a reduced capacity.

Although certain preferred embodiments of the present invention have been shown and described in detail, it should be understood that various changes and modifications may be made therein without departing from the scope of the appended claims.

What is claimed is:

1. A motor vehicle air-conditioner control apparatus comprising:

engine start detecting means for detecting a startup of an engine;

an air-conditioning system compressor operable by the power of said engine through a clutch;

an air-conditioning system operating switch for making said air-conditioning system compressor operable;

an engine coolant temperature sensor for detecting an engine coolant temperature; and control means electrically connected to said engine start detecting means, said clutch, said air-conditioning system operating switch, and said engine coolant temperature sensor, for selectively engaging and disengaging said clutch;

said control means comprising means for changing said clutch from a disengaged state to an engaged state after a liquid refrigerant is discharged from said air-conditioning system compressor to actuate said air-conditioning system compressor when said engine coolant temperature is higher than a predetermined temperature if said air-conditioning system operating switch is detected as being turned on after the startup of said engine is detected.

2. A motor vehicle air-conditioner control apparatus comprising:

engine start detecting means for detecting a startup of an engine;

an air-conditioning system compressor operable by the power of said engine through a clutch;

an air-conditioning system operating switch for making said air-conditioning system compressor operable;

an engine coolant temperature sensor for detecting an engine coolant temperature;

an intake air temperature sensor for detecting an intake air temperature of said engine; and control means electrically connected to said engine start detecting means, said clutch, said air-conditioning system operating switch, said engine coolant temperature sensor, and said intake air temperature sensor, for selectively engaging and disengaging said clutch;

said control means comprising means for changing said clutch from a disengaged state to an engaged state after a liquid refrigerant is discharged from said air-conditioning system compressor to actuate said air-conditioning system compressor when said engine intake air temperature is higher than a predetermined temperature and lower than a multiple of said engine coolant temperature if said air-conditioning system operating switch is detected as being turned on after the startup of said engine is detected.

3. A motor vehicle air-conditioner control apparatus comprising:

engine start detecting means for detecting a startup of an engine;

an air-conditioning system compressor operable by the power of said engine through a clutch;

an air-conditioning system operating switch for making said air-conditioning system compressor operable;

an engine coolant temperature sensor for detecting an engine coolant temperature;

a passenger compartment temperature sensor for detecting a passenger compartment temperature in a passenger compartment; and control means electrically connected to said engine start detecting means, said clutch, said air-conditioning system operating switch, said engine coolant temperature sensor, and said passenger compartment temperature sensor, for selectively engaging and disengaging said clutch;

said control means comprising means for changing said clutch from a disengaged state to an engaged state after a liquid refrigerant is discharged from said air-conditioning system compressor to actuate said air-conditioning system compressor when said passenger compartment temperature is lower than a multiple of said engine coolant temperature if said air-conditioning system operating switch is detected as being turned on after the startup of said engine is detected.

4. A motor vehicle air-conditioner control apparatus comprising:

engine start detecting means for detecting a startup of an engine;

an air-conditioning system compressor operable by the power of said engine through a clutch;

an air-conditioning system operating switch for making said air-conditioning system compressor operable;

an engine coolant temperature sensor for detecting an engine coolant temperature;

engine shutoff time measuring means for measuring an engine shutoff time which has elapsed from a preceding engine shutoff to a present engine startup; and control means electrically connected to said engine start detecting means, said clutch, said air-conditioning system operating switch, said engine coolant temperature sensor, and said engine shutoff time measuring means, for selectively engaging and disengaging said clutch;

said control means comprising means for changing said clutch from a disengaged state to an engaged state after a liquid refrigerant is discharged from said air-conditioning system compressor to actuate said air-conditioning system compressor when said engine coolant temperature is lower than a predetermined temperature and said engine shutoff time is lower than a predetermined time if said air-conditioning system operating switch is detected as being turned on after the startup of said engine is detected.

5. A motor vehicle air-conditioner control apparatus comprising:

engine start detecting means for detecting a startup of an engine;

an air-conditioning system compressor operable by the power of said engine through a clutch;

an air-conditioning system operating switch for making said air-conditioning system compressor operable;

an engine coolant temperature sensor for detecting an engine coolant temperature;

an engine intake air temperature sensor for detecting an intake air temperature of said engine;

engine shutoff time measuring means for measuring an engine shutoff time which has elapsed from a preceding engine shutoff to a present engine startup; and control means electrically connected to said engine start detecting means, said clutch, said air-conditioning system operating switch, said engine coolant temperature sensor, said engine intake air temperature sensor, and said engine shutoff time measuring means, for selectively engaging and disengaging said clutch;

said control means comprising means for changing said clutch from a disengaged state to an engaged state after a liquid refrigerant is discharged from said air-conditioning system compressor to actuate said air-conditioning system compressor when said intake air temperature is higher than a predetermined temperature and lower than a multiple of said engine coolant temperature and said engine shutoff time is lower than a predetermined time if said air-conditioning system operating switch is detected as being turned on after the startup of said engine is detected.

6. A motor vehicle air-conditioner control apparatus comprising:

engine start detecting means for detecting a startup of an engine;

an air-conditioning system compressor operable by the power of said engine through a clutch;

an air-conditioning system operating switch for making said air-conditioning system compressor operable;

an engine coolant temperature sensor for detecting an engine coolant temperature;

an engine rotational speed sensor for detecting a rotational speed of said engine; and control means electrically connected to said engine start detecting means, said clutch, said air-conditioning system operating switch, said engine coolant temperature sensor, and said engine rotational speed sensor, for selectively engaging and disengaging said clutch;

said control means comprising means for changing said clutch from a disengaged state to an engaged state to actuate said air-conditioning system compressor when said engine coolant temperature is lower than a predetermined temperature and said engine rotational speed is lower than a predetermined rotational speed if said air-conditioning system operating switch is detected as being turned on after the startup of said engine is detected.

7. A motor vehicle air-conditioner control apparatus comprising:

engine start detecting means for detecting a startup of an engine;

an air-conditioning system compressor operable by the power of said engine through a clutch;

an air-conditioning system operating switch for making said air-conditioning system compressor operable;

an engine coolant temperature sensor for detecting an engine coolant temperature;

an engine intake air temperature sensor for detecting an intake air temperature of said engine;

an engine rotational speed sensor for detecting a rotational speed of said engine; and control means electrically connected to said engine start detecting means, said clutch, said air-conditioning system operating switch, said engine coolant temperature sensor, said engine intake air temperature sensor, and said engine rotational speed sensor, for selectively engaging and disengaging said clutch;

said control means comprising means for changing said clutch from a disengaged state to an engaged state after a liquid refrigerant is discharged from said air-conditioning system compressor to actuate said air-conditioning system compressor when said intake air temperature is higher than a predetermined temperature and lower than a multiple of said engine coolant temperature and said engine rotational speed is lower than a predetermined rotational speed if said air-conditioning system operating switch is detected as being turned on after the startup of said engine is detected.

8. A motor vehicle air-conditioner control apparatus comprising:

engine start detecting means for detecting a startup of an engine;

an air-conditioning system compressor operable by the power of said engine through a clutch;

an air-conditioning system operating switch for making said air-conditioning system compressor operable;

an engine coolant temperature sensor for detecting an engine coolant temperature;

a passenger compartment temperature sensor for detecting a passenger compartment temperature in a passenger compartment;

an engine rotational speed sensor for detecting a rotational speed of said engine; and control means electrically connected to said engine start detecting means, said clutch, said air-conditioning system operating switch, said engine coolant temperature sensor, said passenger compartment temperature sensor, and said engine rotational speed sensor, for selectively engaging and disengaging said clutch;

said control means comprising means for changing said clutch from a disengaged state to an engaged state after a liquid refrigerant is discharged from said air-conditioning system compressor to actuate said air-conditioning system compressor when said passenger compartment temperature is lower than a multiple of said engine coolant temperature and said engine rotational speed is lower than a predetermined rotational speed if said air-conditioning system operating switch is detected as being turned on after the startup of said engine is detected.

9. A motor vehicle air-conditioner control apparatus comprising:

engine start detecting means for detecting a startup of an engine;

an air-conditioning system compressor operable by the power of said engine through a clutch;

an air-conditioning system operating switch for making said air-conditioning system compressor operable;

an engine coolant temperature sensor for detecting an engine coolant temperature;

an engine rotational speed sensor for detecting a rotational speed of said engine;

engine operating time measuring means for measuring an engine operating time which has elapsed from the startup of said engine; and control means electrically connected to said engine start detecting means, said clutch, said air-conditioning system operating switch, said engine coolant temperature sensor, said engine rotational speed sensor, and said engine operating time measuring means, for selectively engaging and disengaging said clutch;

said control means comprising means for changing said clutch from a disengaged state to an engaged state after a liquid refrigerant is discharged from said air-conditioning system compressor to actuate said air-conditioning system compressor when said engine coolant temperature is lower than a predetermined temperature and said engine rotational speed is higher than a predetermined rotational speed, on the condition that said engine operating time is longer than a predetermined time, if said air-conditioning system operating switch is detected as being turned on after the startup of said engine is detected.

* * * * *